Nov. 14, 1950     K. V. R. BERGGREN     2,529,903
FRAME STRUCTURE JOINT
Filed July 24, 1945

INVENTOR
KARL VILHELM RUDOLF BERGGREN
his ATTY.

Patented Nov. 14, 1950

2,529,903

UNITED STATES PATENT OFFICE 2,529,903

FRAME STRUCTURE JOINT

Karl Vilhelm Rudolf Berggren, Stockholm, Sweden

Application July 24, 1945, Serial No. 606,784
In Sweden March 9, 1944

2 Claims. (Cl. 20—0.5).

The present invention relates to a supporting construction substantially of wood and intended for buildings or the like. It is very suitable as roof construction for industrial buildings of different kinds, estate offices, hangars, conveying devices, scaffolds and so on. Moreover, it can be used with advantage in bridges.

The wood frame works hitherto used have a great many drawbacks. As the frame work has consisted of relatively thick elements, it has always been difficult to vary the element dimension in such a way that all elements have been fully utilized with regard to the loads to which they are subjected. Moreover, it has been almost impossible to get a connection between two load-transmitting elements of such a framework which will be as strong as the elements themselves. Consequently, the connection has determined the strength of the elements which in their turn have become as strong as the connections, and additional elements transversing several frames have had to be inserted to maintain the same section even if the element stresses have been changed. It has also very often been necessary to use full-length timber as frame rods, which in certain cases has required timber of extra length and cross members of special strength, which involves additional timber costs. Moreover, the waste percentage has been relatively great due to cutting off and the like and due to delayed deliveries because the special timber has not been in store. Finally, it may be mentioned that it has hardly been possible to use nails as fixing means because the intersections in solid rods do not offer sufficient support to heavy load transmissions by nailing which in comparison with bolts and washers requires a larger surface.

All these drawbacks are eliminated by the lamella frame work according to the present invention which is substantially characterized by the fact that in an intersection each element consists of a number of lamellae which are arranged at a distance from one another corresponding to the thickness of the lamellae of another element, and that the lamellae of the abutting elements are located between one another so that each lamella of one element will be located adjacent to a lamella of the other element, and that the different lamellae are connected with one another by suitable means.

Intersections in frame works according to the invention are illustrated by way of example on the accompanying drawings.

Figure 1:
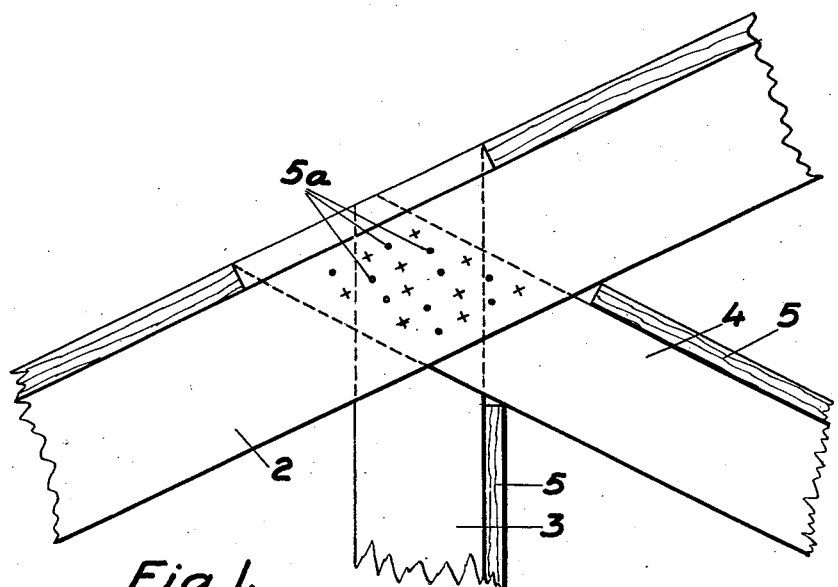
Figure 2:
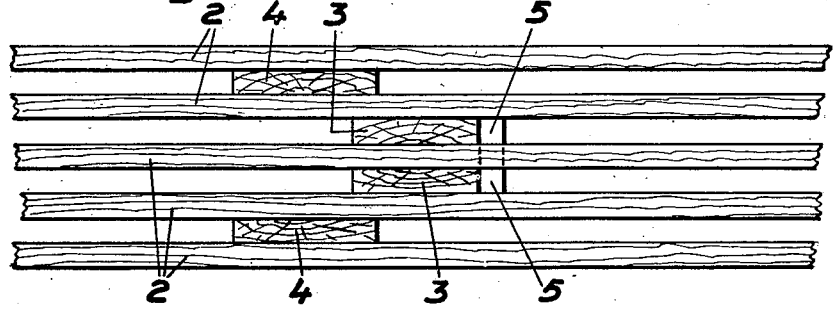

The drawing illustrates as an example an intersection according to the invention. Fig. 1 shows the intersection viewed from the side, and Fig. 2 shows the intersection viewed from above.

The numeral 2 designates lamellae of the same thickness, constituting a principal element when joined. Between these are symmetrically arranged the lamellae 3 of the uprights and the lamellae 4 of the diagonals, which are all of the same thickness as the lamellae of the principal element. It is evident that the lamellae of the different elements may be adjusted to the loads working on them through varying the width of the lamellae in the respective element. In the intersection the lamellae are secured to each other by means of nails 5a. The numeral 5 designates a breakage-preventing reinforcement which is fastened to the elements exposed to pressure.

The construction according to the invention renders the advantage that, for example, a knot might jeopardize and weaken the whole construction, whereas the same weakening in a lamella of course is one-sixth only if six lamellae are used. The same also applies to the intersection where the power is divided up at a plurality of points.

In addition to nails or bolts, glue can be used to advantage with thin relatively broad lamellae. Very small stresses will occur in glued connections with properly dimensioned elements.

Having now described my invention, what I claim as new and desire to secure by Letters Patent is:

1. Frame structure joint comprising three elongated structural elements disposed with their longitudinal axes in a common plane and intersecting each other at a common point, one of said elements being formed in the zone of the joint with a plurality of open mutually spaced slots parallel to each other and to said common plane, a second element having in the zone of the joint a plurality of mutually spaced lamellae fitted in some of the slots of said first element and the third element having in the zone of the joint a plurality of mutually spaced lamellae fitted in others of the said slots of the said first element, and means to secure the lamellae of said second and third elements in the slots of said first element.

2. Frame structure joint, as claimed in claim 1, in which said securing means extend at substantially right angles to said common plane through said first element and second and third elements in the neighborhood of said common point of intersection of the axes of all the elements.

KARL VILHELM RUDOLF BERGGREN.

(References on following page)

REFERENCES CITED

The following references are of record in the file of this patent:

UNITED STATES PATENTS

| Number | Name | Date |
|---|---|---|
| 137,482 | Pratt | Apr. 1, 1873 |
| 2,187,009 | Beattie | Jan. 16, 1940 |

FOREIGN PATENTS

| Number | Country | Date |
|---|---|---|
| 77,086 | Switzerland | Mar. 1, 1918 |
| 151,332 | Great Britain | Sept. 20, 1920 |

OTHER REFERENCES

Modern Connectors for Timber Construction, National Committee on Wood Utilization, Government Printing Office, Washington: 1933, page 8.